United States Patent [19]

Hoffman

[11] 4,238,572

[45] Dec. 9, 1980

[54] FOAMABLE ABS POLYBLEND COMPOSITION

[75] Inventor: Richard L. Hoffman, Wilbraham, Mass.

[73] Assignee: Monsanto Company, St. Louis, Mo.

[21] Appl. No.: 95,015

[22] Filed: Nov. 16, 1979

[51] Int. Cl.³ .............................................. C08J 9/02
[52] U.S. Cl. ...................................... 521/77; 521/81; 521/139; 521/140; 525/74; 525/78
[58] Field of Search ................ 521/139, 77; 525/74, 525/78

[56] References Cited

U.S. PATENT DOCUMENTS

| | | | |
|---|---|---|---|
| 3,642,949 | 2/1972 | Stafford et al. | 525/74 |
| 3,760,047 | 9/1973 | Goeth et al. | 521/77 |
| 3,962,154 | 6/1976 | Elgi | 521/139 |

Primary Examiner—Morton Foelak
Attorney, Agent, or Firm—Joseph S. Nelson; William J. Farrington; Edward P. Grattan

[57] ABSTRACT

The invention relates to a foamable polymeric polyblend of a matrix copolymer of alkenyl aromatic/alkenyl nitrile monomers having dispersed therein (1) a grafted diene rubber being grafted with said monomers and (2) an alkyl half ester of a styrene/maleic anhydride copolymer. The composition is foamed by the thermal decomposition of said half ester. The foamed polyblend has great utility as a structural foam with said composition providing fast molding cycles and fine cell structure. A method for foaming said polyblend is disclosed.

11 Claims, No Drawings

FOAMABLE ABS POLYBLEND COMPOSITION

BACKGROUND OF THE INVENTION

Structural foam plastics are being developed for appliance, automotive and furniture uses providing lower cost, light-weight products having high utility. Such products are molded from compositions that will foam under molding conditions wherein the gas liberating agent will provide gases in situ, at elevated molding temperatures, that blow the molded composition reducing its density by 2 to 50%.

Such foamable moldable compositions will fill injection molds readily, however, the set-up or cooling time in the mold has been longer than for conventional molding causing molding costs to be higher, offsetting the lower material cost advantages.

It is the objective of the present invention to provide foamable polyblend compositions that can be foamed and molded simultaneously with shorter cycles than conventional foamable polymeric materials.

U.S. Pat. No. 3,268,636 discloses a process for the injection molding of foamed plastic articles, teaching the general concepts of molding foamable plastic using thermoplastics and various blowing agents.

The present invention relates to moldable foamable polyblends of relative high density that can be used as structural tough molded articles for furniture, appliances and automotive. Styrenic plastics such as styrene-acrylonitrile copolymers and rubber reinforced polymers (ABS) are used conventionally for such molded articles having high modulus and toughness along with excellent melt flow properties for molding. Such materials when foamed with aliphatic blowing agents ar plasticized with the blowing agents, hence, lose modulus and more importantly have longer set-up times or molding cycles.

It has been found, unexpectedly, that polyblends of high heat distortion interpolymers, in particular, the alkyl half esters of alkenyl aromatic-maleic anhydride interpolymers with ABS polyblends, in amounts of 1 to 10% by weight, provide polyblends that foam readily to produce fine cell structure yet provide moldable polymeric polyblend compositions that have reduced molding cycles and excellent structural engineering properties even though the density has been reduced 2 to 50%.

SUMMARY OF THE INVENTION

The present invention relates to a foamable polymeric polyblend composition comprising:
A. a matrix copolymer of monoalkenyl aromatic and alkenyl nitrile monomers,
B. a grafted conjugated diene rubber grafted with said monomers, and
C. an alkyl half ester of a styrene/maleic anhydride copolymer.

The invention also relates to a method for foaming a polymeric polyblend having the polymeric components:
A. a matrix copolymer of monoalkenyl aromatic and alkenyl nitrile monomers,
B. a grafted conjugated diene rubber grafted with said monomers, and
C. an alkyl half ester of a styrene/maleic anhydride copolymer,
comprising the steps: blending (A), (B) and (C) by melt colloiding at temperatures of 200° to 300° C. under superatmospheric pressures and passing the colloided melt into a zone of lower pressure allowing said polyblend to foam to a density of 2 to 50% less than the density of said polyblend.

PREFERRED EMBODIMENTS

The alkenyl aromatic monomers can be selected from the group consisting of styrene, alpha methyl styrene, halogenated alkenyl aromatic such as chlorostyrene and bromostyrene or mixtures thereof. The alkenyl nitrile monomers can be selected from the group consisting of acrylonitrile and methacrylonitrile or mixtures thereof. The copolymers of alkenyl aromatic and alkenyl nitrile monomers have a weight ratio of said monomers of 85:15 to 15:85 respectively.

The copolymer of alkenyl aromatic and maleic anhydride monomers preferably have a molar ratio of said monomers of 50:50 to 95:5 respectively.

The alkenyl aromatic/maleic anhydride copolymer is esterified with alkyl groups, wherein about 20 to 100% of the maleic anhydride, on a mol basis being in the form of an alkyl half ester.

Said alkyl group has 1 to 6 carbon atoms, said alkyl group being methyl, ethyl, propyl, isopropyl, butyl, isobutyl, pentyl, hexyl and mixtures thereof.

The half esters of the alkenyl aromatic/maleic anhydride copolymers can be prepared by the method disclosed in U.S. Pat. No. 3,576,915 wherein the alkenyl aromatic, maleic anhydride and the alkyl half esters of maleic anhydride monomers are mass polymerized with free radical catalysts. Another suitable method is to prepare the alkenyl aromatic/maleic anhydride copolymer by the method disclosed in U.S. Pat. No. 2,971,939. The maleic anhydride moiety is then esterified on a stoichiometric mol basis to the desired alkyl half ester with an alkyl alcohol having 1 to 6 carbon atoms. The half esters of said copolymers are available commercially under the trademark "Scripset Resins" from the Monsanto Company, St. Louis, Missouri. Such half ester copolymers can have an average molecular weight of about 10,000 to 500,000 or higher, preferably 10,000 to 50,000 Mw.

The diene rubbers are rubbers of conjugated diene monomers, said rubbers being selected from the group consisting of polybutadiene, polyisoprene, polychloroprene and copolymers of butadiene-styrene, butadiene-acrylonitrile wherein the butadiene moiety is greater than 50% preferably greater than 75%.

The grafted diene rubbers are the disclosed diene rubbers grafted with monomers selected from the group consisting of alkenyl aromatic, alkenyl nitrile, maleic anhydride or mixtures thereof. Said rubber is dispersed in said alloy as rubber particles grafted with about 10 to 100 parts of said monomer per 100 parts of rubber having a particle size of about 0.05 to 1.5 microns. Alternatively, the rubber can be dispersed as rubber particles being grafted with and having occluded polymers of said monomers wherein said grafted and occluded polymers are present in amounts of from about 0.5 to 5 parts per 100 parts of rubber, said rubber particles having a particle size of about 0.5 to 30 microns. The particle size is a weight average particle size diameter as determined by a Centrifugal Photosedimentometer (Model 3000 Particle Size Analyzer from Martin Sweets Co., 3131 West Market Street, Louisville, Kentucky). The grafted diene rubbers can be present in said alloy in amounts such that the diene rubber moiety is present in amounts of about 2 to 35% by weight of said alloy.

Styrene-acrylonitrile copolymers including rubber modified SAN polymer or ABS can be prepared by methods disclosed in ABS Plastics by C. H. Basdekis, Reinhold Publishing Corp., New York, N.Y.

Such ABS materials have a styrene-acrylonitrile (SAN) copolymer matrix phase having dispersed therein diene rubber particles grafted with S/AN monomers as a polyblend. The grafted rubber phase is present in an amount of 2 to 35% by weight as a rubber moiety. The rubber particles can have a weight average diameter of about 0.5 to 1.5 microns being grafted with 10 to 100 parts of monomers per 100 parts of rubber. Alternatively, the rubber particles can be grafted with and have occluded SAN copolymers in amounts of 0.5 to 5 parts per part of rubber as disclosed supra.

The examples infra are included to further illustrate the invention but do not limit the scope of the invention.

EXAMPLE 1

An ABS polymer containing about 13.5% by weight of a polybutadiene rubber moiety having a matrix phase copolymer of styrene/acrylonitrile monomers (75/26), said rubber grafted with about 90 parts of said monomers was used for blending. The ABS polyblend was prepared by the method disclosed in U.S. Pat. No. 3,509,237 and contained about 75% matrix phase styrene/acrylonitrile copolymer.

The ABS polymer was blended with a styrene/maleic anhydride polymer (75/25) having about 87% of the maleic anhydride as the methyl half ester such that the polyblend had present about 10% by weight of the half ester. The blend was extrusion-injected molded at 530° F. (277° C.) into ½×½×5" foamed bars. The extrusion injection molding machine used was an one-ounce Arbury Allrounder machine sold by Polymer Machinery Corp., Berlin, Conn. The bars had a density of about 0.6 and an impact strength of about 3.06 ft.lbs./in. The ABS polymer used in the blend was molded and found to have a density of about 1.07 and an impact strength of about 3.2 ft.lbs./in. It is evident that the polyblend composition molds to a foamed part having a density reduction of about 40% but still retains an unexpectedly high level of toughness.

EXAMPLE 2

Example 1 was essentially repeated using a styrene/maleic anhydride (1.4/1) copolymer having a molecular weight of 20,000 and having 20% of the maleic anhydride as the methyl half ester and 75% as the isobutyl half ester. About 5% by weight of the half ester was present in the polyblend and the molded part had a density of 0.70 and an impact strength of 2.9 ft.lbs./in.

EXAMPLES 3-16

Using the process of U.S. Pat. No. 3,458,484, Example 9, wherein the polymerization is carried out at about 110° C. several styrene/maleic acid copolymer half esters were prepared and tested as tabulated below.

TABLE 1

| Ex. | Half Ester Stryrene Ma | | Type Ester | % Half Ester | Wgt. % Ester in Polyblend | Density |
|---|---|---|---|---|---|---|
| 3 | 75 | 25 | methyl | 98 | 1 | 0.90 |
| 4 | 75 | 25 | methyl | 98 | 2 | 0.83 |
| 5 | 75 | 25 | methyl | 98 | 5 | 0.71 |
| 6 | 75 | 25 | methyl | 98 | 10 | 0.60 |
| 7 | 75 | 25 | methyl | 98 | 20 | 0.55 |
| 8 | 75 | 25 | propyl | 95 | 5 | 0.75 |
| 9 | 75 | 25 | propyl | 95 | 10 | 0.65 |
| 10 | 75 | 25 | ethyl | 97 | 5 | 0.70 |
| 11 | 75 | 25 | ethyl | 97 | 10 | 0.61 |
| 12 | 75 | 25 | butyl | 96 | 5 | 0.72 |
| 13 | 75 | 25 | pentyl | 98 | 5 | 0.74 |
| 14 | 75 | 25 | hexyl | 98 | 5 | 0.76 |
| 15 | 50 | 50 | methyl | 98 | 5 | 0.65 |
| 16 | 85 | 15 | methyl | 98 | 5 | 0.80 |

What is claimed is:

1. A foamable polymeric polyblend composition comprising:
   A. a matrix copolymer of monoalkenyl aromatic and alkenyl nitrile monomers,
   B. a grafted conjugated diene rubber grafted with said monomers, and
   C. an alkyl half ester of a styrene/maleic anhydride copolymer as the blowing agent.

2. A foamable composition of claim 1 wherein said monoalkenyl aromatic monomer is styrene, aralkyl styrene, arhalostyrene, alpha methyl styrene and mixtures thereof.

3. A foamable composition of claim 1 wherein said alkenyl nitrile monomer is acrylonitrile, alphamethyl acrylonitrile or mixtures thereof.

4. A foamable composition of claim 1 wherein said diene rubber is polybutadiene, polychloroprene, polyisoprene, copolymers of butadiene-styrene, butadiene-acrylonitrile and mixtures thereof.

5. A foamable composition of claim 1 wherein said alkyl group having 1 to 6 carbon atoms or mixtures thereof.

6. A foamable composition of claim 1 wherein said styrene-maleic anhydride copolymer has a mol ratio of monoalkenyl aromatic momomer to maleic anhydride monomer of about 50:50 to 95:5 with about 20 to 100% of the maleic anhydride, on a mol basis, being in the form of alkyl half ester.

7. A foamable composition of claim 1 wherein said alkyl acid ester of said styrene/maleic anhydride copolymer has an alkyl group having 1 to 6 carbon atoms.

8. A foamable composition of claim 7 wherein said alkyl group is methyl, ethyl, propyl, isopropyl, butyl, isobutyl, pentyl, hexyl and mixtures thereof.

9. A foamable composition of claim 1 wherein said alkyl half ester of maleic anhydride is present in said foamable polyblend in an amount sufficient to reduce the density of the polyblend by 5 to 50% and said grafted diene rubber is present in an amount of about 5 to 25% by weight.

10. A foamable composition of claim 1 wherein said alkyl half ester is present in said foamable polyblend in an amount of about 1 to 20% by weight and said grafted diene rubber is present in an amount of about 5 to 25% by weight.

11. A method for foaming a polymeric polyblend having the polymeric components:
   A. a matrix copolymer of monoalkenyl aromatic and alkenyl nitrile monomers,
   B. a grafted conjugated diene rubber grafted with said monomers, and
   C. an alkyl half ester of a styrene/maleic anhydride copolymer, comprising the steps: blending (A), (B) and (C) by melt colloiding at temperatures of 200° to 300° C. under superatmospheric pressures and passing the colloided melt into a zone of lower pressure allowing said polyblend to foam to a density of 2 to 50% less than the density of said polyblend.

* * * * *